United States Patent Office 3,078,154
Patented Feb. 19, 1963

3,078,154
METHOD FOR INHIBITING THE GROWTH
OF PLANTS
Hans Gysin, Basel, and Enrico Knüsli, Riehen, near Basel, Switzerland, assignors to J. R. Geigy A.-G., Basel, Switzerland
No Drawing. Filed Nov. 27, 1959, Ser. No. 855,503
Claims priority, application Switzerland Nov. 7, 1956
10 Claims. (Cl. 71—2.5)

The present application is a continuation-in-part of co-pending application Serial No. 692,049, filed October 24, 1957 (now U.S. Patent No. 2,923,614).

The present invention is concerned with the use of new triazine derivatives having phytobiological activity for the inhibition of plant growth.

It has surprisingly been found that even in low concentrations s-triazine derivatives of the general formula:

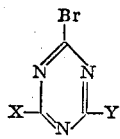

wherein

X represents a member selected from the group consisting of ethylamino and isopropylamino radicals, and
Y represents a member different from X, selected from the group consisting of methylamino, ethylamino, diethylamino, n-propylamino and allylamino radicals, inhibit the growth of and eventually kill plants.

The s-triazine compounds defined above can be produced in a simple manner by reacting cyanuric bromide in the presence of an acid binding agent with one mol of an amine of the general formula

X—H                        II and one mol of a different amine of the general formula:

Y—H                        III the amines being used in any order. In these general Formulae II and III, X and Y have the meanings given in Formula I. As acid binding agent, for example an excess of the amines used in the reaction or an alkali metal carbonate or hydroxide can be used. The reaction can be performed, for example at room temperature or at a moderately raised temperature in the presence or absence of solvents or diluents.

Amines of the general Formula II for reaction with cyanuric bromide are: ethylamine and isopropylamine. Amines of the general Formula III are: methylamine, ethylamine, diethylamine, n-propylamine and allylamine.

The following example illustrates the production of the new compounds. Parts are given as parts by weight and the temperatures are in degrees centigrade.

Example 1

53 parts of freshly prepared cyanuric bromide are suspended in 180 parts of chlorobenzene, to which 20 parts of isopropylamine dissolved in 20 parts of chlorobenzene are added dropwise at —10–0°, and the whole is stirred at 0°. As soon as the reaction product reacts neutral, it is filtered off from the difficultly soluble material. The chlorobenzene fraction is dried, whereupon the solvent is distilled in vacuo and the crude 2.6-dibromo-4-isopropylamino-s-triazine is obtained. The chlorobenzene solution may, however, be used direct for the further reaction without isolating the 2.6-dibromo-4-isopropylamino-s-triazine.

21 parts of 2.6-dibromo-4-isopropylamino-s-triazine are dissolved in 100 parts of benzene and 8.3 parts of n-propylamine dissolved in 32 parts of benzene are added dropwise at room temperature. The desired reaction product soon begins to precipitate. By raising the temperature to 40–50° the reaction is completed. The precipitated 2-bromo-4-isopropylamino - 6 - n - propylamino-s-triazine having good purity can be recrystallised from cyclohexane. Melting point 146–148°.

In an analogous manner 2-bromo-4-isopropylamino-6-diethylamino-s-triazine is obtained by reaction of 2.6-dibromo - 4 - isopropylamino-s-triazine with diethylamine. Distillation occurs at 125–128° under 0.1 mm. pressure and the product melts at 66.5–68.5° after recrystallisation from benzene/ether.

Compounds of the general Formula I defined above are excellently suited as active ingredients for weed killers, both for the selective repression and destruction of weeds among cultivated plants as well as for the total destruction of and later prevention of undesirable plant growth. By weeds are meant here also for example undesirable growth of a previously planted crop. The compounds defined above are also suitable as active ingredients causing other inhibitive influences on plant growth, in particular defoliation, for example of cotton plants, acceleration of ripeness by premature desiccation, for example the leaves of potato plants, also for the reduction of fruit development, delaying of blossoming, prolongation of the harvesting period and the storing time. Under some circumstances the use of agents having an inhibitive action on plant growth can not only lead to an increase in crop yield by destroying the weeds, but can also counteract influences which could stimulate the growth of cultivated plants in an undesirable direction, such as for example high temperature or abundant use of fertilisers. On the other hand, the use of herbicides can also be of interest in the long run for the destruction of obstinate weeds when the selectivity of the agent is not sufficient to exclude the possibility of a reduction in crop yield at the time of application of the agents.

The following compounds may be used as active ingredients:

(I) 2-bromo-4-ethylamino-6-methylamino-s-triazine, M.P. 224–225°,
(II) 2 - bromo-4-ethylamino-6-allylamino-s-triazine, M.P. 188–189.5°,
(III) 2 - bromo-4-ethylamino-6-n-propylamino-s-triazine, M.P. 187–188°,
(IV) 2-bromo-4-ethylamino - 6 - diethylamino-s-triazine, M.P. 95–96.5°,
(V) 2 - bromo-4-isopropylamino - 6 - methylamino-s-triazine, M.P. 135–137°,
(VI) 2 - bromo - 4 - isopropylamino-6-ethylamino-s-triazine, M.P. 162–163.5°,
(VII) 2-bromo-4-isopropylamino - 6 - diethylamino-s-triazine, M.P. 66.5–68.5°,
(VIII) 2-bromo-4-isopropylamino - 6 - allylamino-s-triazine, M.P. 141–143.5°,
(IX) 2 - bromo-4-isopropylamino-6-n-propylamino-s-triazine, M.P. 146–148°.

The weed killers according to the present invention can be in the form of solutions, emulsions, suspensions or dusts, depending on the intended use. It must be possible, however, to finely distribute the active ingredient in all forms of application. In particular in the case of total destruction of all plant growth, in premature desiccation as well as defoliation, the action can be strengthened by the use of carriers which are phytotoxic in themselves such as, for example, high boiling mineral oil fractions or chlorinated hydrocarbons; on the other hand generally the selectivity of growth inhibition can be more clearly marked by the use of carriers which are indifferent to plants, for example in selective weed killers.

Examples of solvents which can be used for the production of solutions are, in particular, alcohols, for example ethyl or isopropyl alcohol; ketones such as acetone or cyclohexanone; aliphatic hydrocarbons such as kerosene, and cyclic hydrocarbons such as benzene, toluene, xylene, tetrahydronaphthalene, alkylated naphthalenes; in addition, chlorinated hydrocarbons such as tetrachlorethane, ethylene chloride and, finally, also mineral and vegetable oils or mixtures of the above substances.

By aqueous forms are meant chiefly emulsions and dispersions. The substances either as such or in one of the solvents mentioned above are homogenised in water, advantageously by means of wetting and dispersing agents. Examples of cation active emulsifying or dispersing agents are quaternary ammonium compounds; of anion active emulsifying or dispersing agents: soaps, soft soap, aliphatic long chain sulphuric acid monoesters, aliphatic aromatic sulphonic acids, long chain alkoxy acetic acids; of non-ionogenic emulsifying or dispersing agents: condensation products of ethylene oxide alone or with suitable hydroxyl compounds such as fatty alcohols, higher alkyl phenols or partial esters of fatty acids with sorbitane. Also concentrates consisting of active ingredient, emulsifier or disperser and, if necessary, solvent, can be produced which are suitable for dilution with water.

Dusts can be produced chiefly by mixing or milling together the active ingredient and a solid carrier. As such can be named: talcum, diatomaceous earth, kaolin, bentonite, calcium carbonate, boric acid, tricalcium phosphate, also however, sawdust, cork, powder, charcoal and other materials of vegetable origin. On the other hand, the substances can be drawn onto the carrier by means of a volatile solvent. By the addition of wetting agents and protective colloids, pulverulent preparations and pastes can be made suspendible in water and used as sprays.

As the active ingredients according to the present invention are solid, powder or paste concentrates for aqueous suspensions having a high concentration of active ingredient can be produced easily.

The various forms of application can be adapted to the intended use in the usual way by the addition of substances which improve the distribution, the adhesive properties, the resistance to rain and, possibly, the penetrating powers. Examples of such substances are fatty acids, resins, wetting agents, glue, casein or alginates. In the same way their biological activity can be increased by the addition of substances having bactericidal, fungicidal or also properties influencing the growth of plants, as well as fertilisers. For complete destruction and hindering of further plant growth, for example from 5–20 kg. of 2-bromo-4-isopropyl-amino-6-ethylamino-s-triazine per hectare are used and for selective weed killing, for example in corn crops, 0.5–5 kg. per hectare are used. In both cases, the action is of remarkably long duration.

In the following, examples of typical application forms are given as well as results from a greenhouse test and a field test.

*Example 2*

20 parts of 2 - bromo - 4 - ethylamino-6-methylamino-s-triazine and 80 parts of talc are milled to the greatest fineness in a ball mill. The mixture obtained can be used as a dust.

*Example 3*

20 parts of 2-bromo-4-isopropylamino-6-diethylamino-s-triazine or 2-bromo-4-ethylamino-6-diethylamino-s-triazine are dissolved in a mixture of 48 parts of diacetone alcohol, 16 parts of xylene and 16 parts of an anhydrous high molecular condensation product of ethylene oxide with higher fatty acids. This concentrate can be diluted with water to form emulsions of any concentration desired.

*Example 4*

80 parts of 2-bromo-4-ethylamino-6-allylamino-s-triazine or 2-bromo-4-ethylamino-6-diethylamino-s-triazine are mixed with 2–4 parts of a wetting agent, for example a sulphuric acid ester of an alkyl polyglycol ether, 1–3 parts of a protective colloid, for example sulphite waste liquor, and 15 parts of an inert solid carrier such as, e.g. kaolin, bentonite, chalk or kieselguhr and the mixture is then ground finely in a suitable mill. Stirred with water, the wettable powder obtained produces very stable suspensions.

*Example 5*

10 parts of 2-bromo-4-isopropylamino-6-diethylamino-s-triazine are dissolved in 90 parts of trichlorethylene or in a high boiling liquid such as, e.g. coal tar oil, diesel oil or spindle oil.

*Example 6*

30 grains of oats, ryegrass, mustard, sugar beet, cucumber, cotton, vetch and corn were sown in flats which were filled 5 cm. high with screened earth prepared in the following way. 100 mg. of active substance, evenly distributed into 1 g. of talcum powder are incorporated into 1 litre of earth homogenously. Within 20 days, the seedlings of all tests plants with the exception of corn were destroyed when the active ingredient was 2-bromo-4-ethylamino-6-methylamino-s-triazine, 2-bromo-4-ethylamino-6-diethylamino-s-triazine or 2-bromo-4-isopropylamino-6-ethylamino-s-triazine.

All the test plants with the exception of corn and cotton were destroyed by applying 2-bromo-4-ethylamino-6-n-propylamino-s-triazine or 2-bromo-4-isopropylamino-6-n-propylamino-s-triazine in the above mentioned manner.

*Example 7*

In a pre-emergence test, 15–20 grains each of oats, ryegrass, mustard, sugar beet, cucumber and spinach were set 1 cm. deep in seed boxes filled with earth. The surface of the earth in the seed boxes was sprayed directly after the seeds were set with 0.5% aqueous emulsions of the different active ingredients enumerated in column 2. These aqueous emulsions were prepared from a 50% wettable powder of the active ingredients by mixing with water. The concentration of active ingredients used was 0.1 g. per sq. metre. Then the treated seed boxes were kept in a greenhouse for 21 days. All the test plants germinated normally, but after 21 days the following observations were made:

With the active ingredient VI, all the test plants were killed; compound V killed all the test plants with the exception of ryegrass which was heavily injured. Using the ingredients I, II, III, IV, VII, VIII, IX, oats and ryegrass showed perfectly normal growth, but sugar beet was completely destroyed. Spinach plants were only slightly injured by compounds I and II, but destroyed by compounds III, VII, VIII and IX. Cucumber plants were only slightly affected by compounds II, IV and VII, but heavily injured by compounds I, III, and IX. Mustard was only slightly affected by compounds II, VIII and IX but heavily injured by compound VII.

What we claim is:

1. A method of inhibiting the growth of a plant which comprises bringing 2-bromo-4-ethylamino-6-methylamino-s-triazine into contact with the plant in an amount sufficient to inhibit plant growth.

2. A method of inhibiting the growth of a plant which comprises bringing 2-bromo-4-ethylamino-6-allylamino-s-triazine into contact with the plant in an amount sufficient to inhibit plant growth.

3. A method of inhibiting the growth of a plant which comprises bringing 2 - bromo-4-ethylamino-6-n-propylamino-s-triazine into contact with the plant in an amount sufficient to inhibit plant growth.

4. A method of inhibiting the growth of a plant which comprises bringing 2-bromo-4-ethylamino-6-diethylaminos-triazine into contact with the plant in an amount sufficient to inhibit plant growth.

5. A method of inhibiting the growth of a plant which comprises bringing 2-bromo-4-isopropylamino-6-methylamino-s-triazine into contact with the plant in an amount sufficient to inhibit plant growth.

6. A method of inhibiting the growth of a plant which comprises bringing 2-bromo-4-isopropylamino-6-ethylamino-s-triazine into contact with the plant in an amount sufficient to inhibit plant growth.

7. A method of inhibiting the growth of a plant which comprises bringing 2-bromo-4-isopropylamino-6-diethylamino-s-triazine into contact with the plant in an amount sufficient to inhibit plant growth.

8. A method of inhibiting the growth of a plant which comprises bringing 2 - bromo-4-isopropylamino-6-allylamino-s-triazine into contact with the plant in an amount sufficient to inhibit plant growth.

9. A method of inhibiting the growth of a plant which comprises bringing 2-bromo-4-isopropylamino-6-n-propylamino-s-triazine into contact with the plant in an amount sufficient to inhibit plant growth.

10. A method of inhibiting the growth of a plant which comprises bringing into contact with at least a part of the plant an agricultural composition consisting essentially of a triazine derivative of the formula

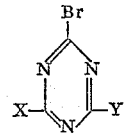

wherein X is a member selected from the group consisting of ethylamino and isopropylamino groups, and Y is a member selected from the group consisting of methylamino, ethylamino, diethylamino, n-propylamino and allylamino groups, X and Y being different from each other, in a concentration sufficient to inhibit plant growth.

References Cited in the file of this patent

UNITED STATES PATENTS

| | | |
|---|---|---|
| 2,312,692 | D'Alelio | Mar. 2, 1943 |
| 2,891,855 | Gysin et al. | June 23, 1959 |
| 2,923,614 | Gysin et al. | Feb. 2, 1960 |

FOREIGN PATENTS

| | | |
|---|---|---|
| 1,135,848 | France | Dec. 22, 1956 |